United States Patent
Lazarus

[11] Patent Number: 6,054,204
[45] Date of Patent: Apr. 25, 2000

[54] LOOSEFILL PACKING MATERIAL

[75] Inventor: Charles R. Lazarus, Kitchawan, N.Y.

[73] Assignee: ENPAC (Environmental Packing, L.P.), Wilmington, Del.

[21] Appl. No.: 08/969,908

[22] Filed: Nov. 13, 1997

[51] Int. Cl.$^7$ .................................................. C08L 3/02
[52] U.S. Cl. .......................... 428/219; 206/584; 428/402; 106/206.1; 106/209.1; 106/217.2; 106/217.3
[58] Field of Search ............................ 428/15, 402, 219; 206/584, 814; 493/967; 106/209.1, 206.1, 217.3, 217.2; 220/429

[56] References Cited

U.S. PATENT DOCUMENTS

| | | | |
|---|---|---|---|
| 4,863,655 | 9/1989 | Lacourse et al. | 264/53 |
| 5,035,930 | 7/1991 | Lacourse et al. | 264/53 |
| 5,043,196 | 8/1991 | Lacourse et al. | 264/53 |
| 5,252,271 | 10/1993 | Jeffs | 264/54 |
| 5,512,090 | 4/1996 | Franke et al. | 106/154.1 |

FOREIGN PATENT DOCUMENTS

| | | | |
|---|---|---|---|
| 587078 A1 | 3/1994 | European Pat. Off. | C08J 9/12 |
| 696611 A2 | 2/1996 | European Pat. Off. | C08J 9/00 |
| WO 92/08759 | 5/1992 | WIPO | C08L 3/02 |

*Primary Examiner*—Alexander Thomas
*Attorney, Agent, or Firm*—Eugene Zagarella, Jr.

[57] ABSTRACT

A substantially odor-free loosefill packing material with a density of from 0.33 to about 0.44 pounds per cubic foot. The packing material contains from about 70 to about 95 weight percent of wheat starch, from about 9 to about 14 weight percent of partially hydrolyzed polyvinyl alcohol, from about 0.7 to about 2.0 weight percent of vegetable fat, from about 0.1 to about 0.4 weight percent of inorganic nucleating agent, from about 3 to about 5 weight percent of maltodextrin with a dextrose equivalent less than 20, and from about 6.0 to about 8.5 weight percent of water.

19 Claims, 2 Drawing Sheets

LOOSEFILL PACKING MATERIAL

FIELD OF THE INVENTION

A substantially odor-free loosefill packing material with a density of from about 0.33 to about 0.44 pounds per cubic foot which contains starch, water, poly(vinyl alcohol), fat, and an inorganic nucleating agent.

BACKGROUND OF THE INVENTION

Loosefill packing materials are well known to those skilled in the art. By way of illustration and not limitation, loosefill packaging materials made from expanded starch products are described in U.S. Pat. Nos. 5,512,090, 5,252,271, 4,863,655, 5,035,930, 5,043,196, and the like. The disclosure of each of these United States patents is hereby incorporated by reference into this specification.

U.S. Pat. No. 5,512,090 of Hans G. Franke is typical of the prior art patents describing loosefill packaging material. The loosefill packaging material of this patent contains from about 3 to about 10 percent of proteinaceous grain meal such as, e.g., white cornmeal; the presence of this proteinaceous grain meal makes the loosefill material attractive to rodents and insects, and it imparts an odor to the loosefill material which is especially noticeable in warmer climates.

The preferred embodiment of the Franke patent is described in the Example thereof. According to the patent, the density of the product was 0.54 pounds per cubic foot, which was allegedly substantially superior to the densities of the competitive "ECO-FOAM" material (with a density of 0.60 pounds per square foot) and "ENVIROFIL" material (with a density of 0.64 pounds per cubic foot). This density, however, is unacceptably high.

It is an object of this invention to provide a novel loosefill material with a density of from about 0.33 to about 0.44 pounds per cubic foot.

It is another object of this invention to provide a substantially odor-free loosefill material.

It is yet another object of this invention to provide a novel loosefill material with a uniform cell structure.

These and other objects will be apparent from the following description of the invention.

SUMMARY OF THE INVENTION

In accordance with this invention, there is provided a substantially odor-free loosefill packing material with a density of from about 0.33 to about 0.44 pounds per cubic foot which contains starch, water, poly(vinyl alcohol), fat, and an inorganic nucleating agent.

BRIEF DESCRIPTION OF THE DRAWINGS

The invention will be described by reference to the specification and the enclosed drawings, in which like reference numerals refer to like elements and in which.

DESCRIPTION OF THE PREFERRED EMBODIMENTS

The process described hereinafter preferably is conducted in single screw extruder, although other types of extruders (such as twin screw extruders, adiabatic extruders, and the like) may also be used. By way of illustration and not limitation, one may use one or more of the single screw extruders described in U.S. Pat. Nos. 5,551,777, 5,512,601, 5,393,796, 5,508,323, 5,496,936, 5,412,014, 5,391,594, 4,959,186, 4,696,575, 4,214,849, 3,496,603, and the like. The disclosure of each of these United States patents is hereby incorporated by reference into this specification.

In one embodiment, the single screw extruder used in the process of this invention is a "model 525" single screw extruder manufactured by Extru-Tech Corporation of Sabetha, Kans. In another embodiment, the single screw extruder used in the process of this invention is a "model 650" or a "model 750" extruder manufactured by the Maddox Metal Works of Dallas, Tex.

Alternatively, one may use a suitable twin screw extruder such as, e.g., those described in U.S. Pat. Nos. 5,512,090, 4,935,183, 4,875,847, 4,423,960, 4,212,543, and the like. The entire disclosure of each of these United States patents is hereby incorporated by reference into this specification.

It is preferred to use an extruder which will produce an operating pressure of at least about 1,400 pounds per square inch gauge (psig). As will be apparent to those skilled in the art, most extruders which are commercially available today are equipped with pressure gauges.

Without wishing to be bound to any particular theory, applicant believes that the use of at least this operating pressure, in conjunction with applicant's novel formulation, allows for the production of a uniform cell structure in applicant's expanded starch product.

In a more preferred embodiment, the extruder used in the process produces an operating pressure of at least about 1,700 pounds per square inch gauge.

Applicant's preferred process will now be described by reference to FIG. 1, which is a flow sheet.

Figure 1:
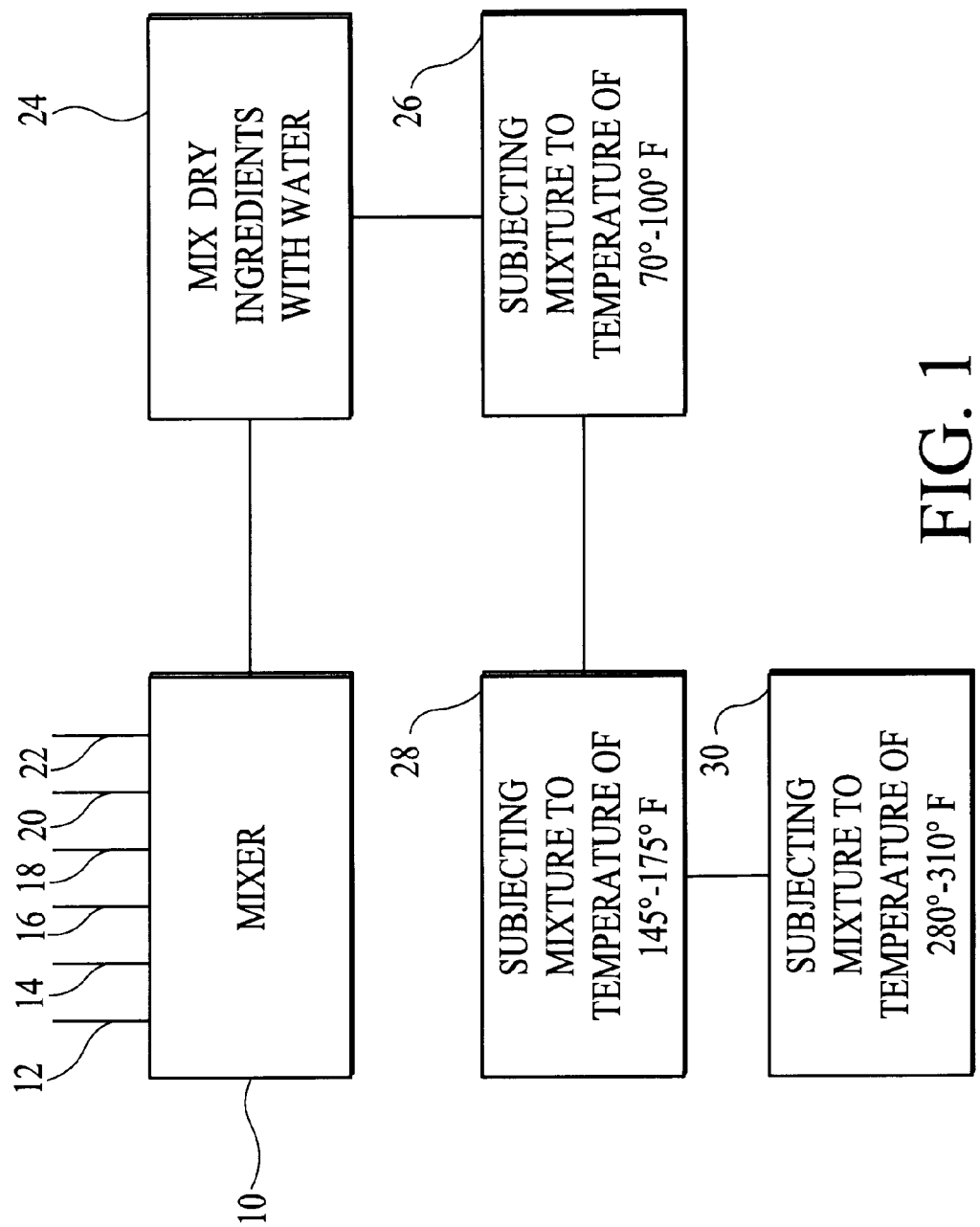
FIG. 1 is a flow sheet of one preferred embodiment of the invention.

Referring to FIG. 1, starch is charged to mixer 10 via line 12. Mixer 10 can be any mixer suitable for mixing dry ingredients such as, e.g., a ribbon blender. One may use, e.g., the ribbon blenders disclosed in U.S. Pat. Nos. 4,956,675, 4,887,132, 4,707,107, and the like.

In general, from about 70 to about 95 parts, by total weight of dry material charged to ribbon blender 10, of starch are charged via line 12. It is preferred to charge from about 80 to about 92 weight percent of starch via line 12. In an even more preferred embodiment, from about 82 to about 86 parts by weight of starch are charged via line 12.

The starch charged via line 12 is preferably wheat starch. As is known to those skilled in the art, wheat starch is a fine white starch made by separating out the gluen of wheat flour by wash flotation. See, e.g., page 800 of George S. Brady et al.'s "Materials Handbook," Thirteenth Edition (McGraw-Hill, Inc., New York, 1991).

One may use any of the wheat starches known to those skilled in the art. Thus, by way of illustration and not limitation, one may use one or more of the wheat starches disclosed in U.S. Pat. Nos. 4,587,332, 4,132,566, 4,830,867, 5,296,250, 3,951,948, 4,280,718, 3,901,725, 4,034,125, 3,743,512, and the like. The disclosure of each of these United States patents is hereby incorporated by reference into this specification.

In one embodiment, the wheat starch used in applicant's process is native wheat starch purchased from the Archer-Daniels Midland Corporation.

Referring again to FIG. 1, an organic, water-soluble polymer is charged to mixer 10 via line 14. In one embodiment, the organic, water-soluble polymer is partially hydrolyzed polyvinyl alcohol.

As is known to those skilled in the art, polyvinyl alcohol is a water soluble synthetic polymer made by alcoholysis of polyvinyl acetate. It is commercially available from many sources and is sold, e.g. as "AIRVOL" Polyvinyl Alcohol by the Air Products and Chemicals, Inc. of 7201 Hamilton Boulevard, Allentown, Pa.

The preferred polyvinyl alcohol is a partially hydroylyzed polyvinyl alcohol such as, e.g., Airvol 523, Airvol 540, etc. These Airvols generally have a degree of hydrolysis of from about 87 to about 90 percent.

In one preferred embodiment, the polyvinyl alcohol has a viscosity of from about 23 to about 27 centipoise. In another preferred embodiment, the polyvinyl alcohol has a viscosity of from about 45 to about 55 centipoise.

In general, it is preferred to charge from about 9 to about 14 parts, by weight of total dry material charged to mixer 10, of the polyvinyl alcohol. It is more preferred to use from about 9 to about 11 parts by weight of polyvinyl alcohol.

In one embodiment, the polvinyl alcohol charged to mixer 10 has a particle size distribution such that at least about 70 weight percent of its particles are between about 0.5 millimeters and 2.0 millimeters in maximum dimension.

Referring again to FIG. 1, from about 0.7 to about 2.0 parts by weight of vegetable fat is charged via line 16 to mixer 10. As is known to those skilled in the art, a vegetable fat is a semisolid vegetable oil that is used chiefly for food. See, e.g., page 880 of the aforementioned George S. Brady et al. text.

By way of illustration, one may use one or more of the vegetable fats disclosed in U.S. Pat. Nos. 5,603,978, 5,571,527, 5,554,408, 5,549,922, 5,532,010, 5,431,948, 5,372,825, 3,939,281, H001620, and the like. The disclosure of each of these United States patent documents is hereby incorporated by reference into this specification.

In one embodiment, the vegetable fat used in the process is soybean triglyceride. One may use one or more of the well-known soybean triglyceride compositions described in U.S. Pat. Nos. 4,847,296, 4,810,726, 4,152,278, 4,545,941, 3,619,213, and the like. The disclosure of each of these United States patents is hereby incorporated by reference into this specification.

In one embodiment, the soybean triglyceride composition used is sold by Kraft Foods Company.

Referring again to FIG. 1, from about 0.1 to about 0.4 parts by weight of an inorganic nucleating agent is added via line 18 to mixer 10. It is preferred to use from about 0.2 to about 0.35 weight percent of the inorganic nucleating agent.

One may use any of the inorganic nucleating agents disclosed in the prior art. Thus, by way of illustration and not limitation, one may use one or more of the inorganic nucleating agents disclosed in U.S. Pat. No. 5,032,458 (alkali earth carbonates and oxides such as titanium oxide and aluminum oxide, talc, silicates, boron nitride, and the like), U.S. Pat. No. 4,931,538 (neutral clay, talc, oxides, sulfates, or silicates of Group II metals such as zinc oxide, magnesium oxide, calcium oxide, calcium silicate, magnesium silicate, calcium sulfate, barium sulfate, etc.), U.S. Pat. Nos. 4,902,553, 4,824,718, 4,801,640, 4,772,652, 3,632,402, 3,619,266, 4,639,480, 4,448,901, 4,425,457, 4,102,853, and the like. The disclosure of each of these United States patents is hereby incorporated by reference into this specification.

It is preferred that the inorganic nucleating agent be selected from the group consisting of talc, alkali metal bicarbonates, alkaline earth metal bicarbonates, and the like.

In one preferred embodiment, the inorganic nucleating agent is talc. As is known to those skilled in the art, talc is a soft, friable mineral of fine colloidal particles with a soapy feel. It is a hydrated magnesium of the formula $4SiO_2 \cdot 3MgO \cdot H_2O$ with a specific gravity of 2.8 and a hardness of 1 Mohs. Talc is commercially available and may be purchased, e.g., from the Whittaker, Clark & Daniels, Inc. of 1000 Coolidge Street, South Plainfield, N.J. as product numbers 399 or 2610.

In another embodiment, not shown, one uses from about 0.2 to about 0.45 weight percent of organic nucleating agent.

Referring again to FIG. 1, and in the preferred embodiment depicted therein, one may optionally also charge via line 20 from about 0.005 to about to 0.1 weight percent of poly(methylvinylether/maleic acid), which is also commonly known as 2-butenediocic acid(Z)-, and is a polymer with methoxethene. This material is sold under the trade name "GANTREZ S-97 BF", or "GANTREZ-S-95" by ISP Technologies Inc. of 1361 Alps Road, Wayne, N.J. Without wishing to be bound to any particular theory, applicant believes that the use of such material substantially lowers the density of the final loosefill product.

Referring again to FIG. 1, one also may optionally charge via line 22 from about 3 to about 5 weight percent, by dry weight of total mixture in mixer 10, of maltodextrin. As is known to those skilled in the art, maltodextrin is a glucose compositon with a dextrose equivalent of less than 20. The maltodextrin used in the process of the invention has a glucose eqquivalent of less than about 10.

Maltodextrins are well known to those skilled in the art. See, e.g., U.S. Pat. Nos. 5,656,746, 5,612,202, 5,597,608, 5,584,937, 5,571,334, and the like. The disclosure of each of these United States patents is hereby incorporated by reference into this specifciation.

In one embodiment, the maltodextrin material used is sold as "MALTODEXTRIN MO40" by the Grain Processing Corporation of Iowa.

Referring again to FIG. 1, the dry ingredients mixed in mixer 10 are mixed with water in step 24 of the process. In general, it is preferred to use from about 8 to about 1 pounds of water for each 100 pounds of dry mixture from mixer 10 and water. In one preferred embodiment, from about 9 to about 10 weight percent of water is used.

As will be apparent to those skilled in the art, when the starch/water mixture is extruded through die 68, it expands while simultaneously flashing off water. Thus, the final product generally contains only from about 6 to about 8.5 weight percent of water, by total weight of product.

Thereafter, the mixture of water, starch, and other materials is conveyed in the extruder to the mixing/shearing section, in which it is subjected to a temperature of from about 70 to about 100 degrees Fahrenheit; see, e.g., step 26 of FIG. 1.in the first stage of the extruder to a temperature of from about 70 to about 100 degrees Fahrnheit and, preferably, from about 75 to 85 degrees Fahrenheit. It is preferred to subject the mixture to this temperature for from about 5 to about 10 seconds while conveying it down the extruder barrel.

Thereafter, the mixture of water, starch and other materials is subjected in step 28 to a temperature of from about 145 to about 175 degrees Fahrenheit (and, more preferably, to a temperature of from about 150 to about 160 degrees Fahrenheit) for from about 5 to about 10 seconds while conveying it further down the extruder barrel.

Thereafter, and again referring to FIG. 1, in step 30 the mixture is conveyed to the die and subjected to a temperature of from about 280 to about 310 degrees Fahrenheit for a period of from about 3 to about 10 seconds. It is preferred to use a temperature of from about 285 to about 295 degrees Fahrenheit in this stage.

Figure 2:
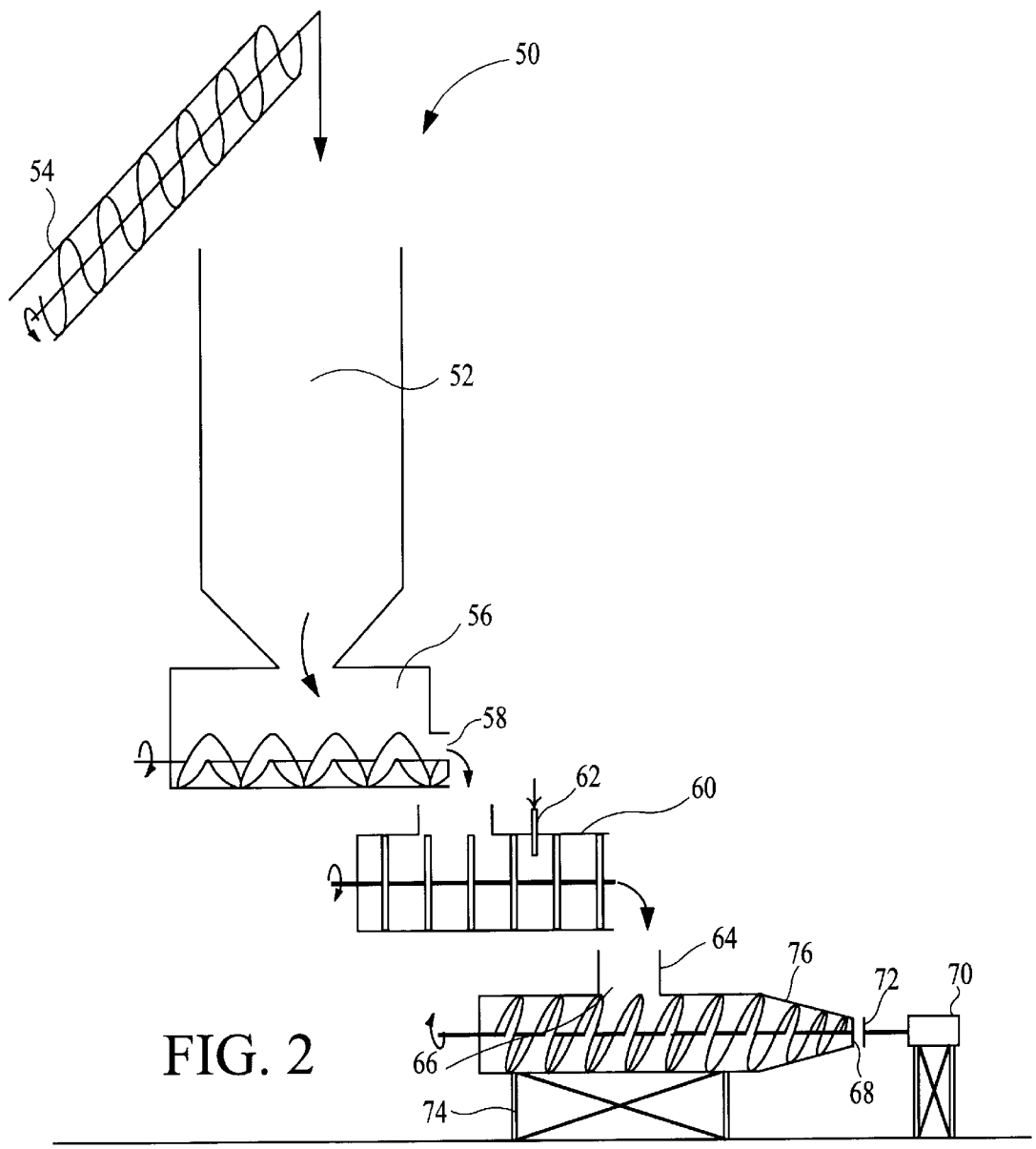
FIG. 2 is a schematic of one preferred single screw extruder used in the process of the invention.

FIG. 2 is a schematic of a single screw extruder 50 which can be used in the process of this invention. Referring to FIG. 1, it will be seen that single screw extruder 50 is comprised of a hopper 52 into which the ingredients referred to hereinabove in reference to step 10 (and mixer 10) are charged via line 54. The dry ingredients from hopper 52 are then gravity fed to feeder 56, which conveys the material via auger 58 to conditioner 60.

In conditioner 60, water is added via line 62, and the water/solids mixture is then fed via line 64 to the inlet section 66 of the extruder. Thereafter, by means of a screw (not shown), the mixture is conveyed exit die 68, at which point is it cut by cutter 70 comprised of knife 72. The assembly is supported by stand 74.

Figure 3:
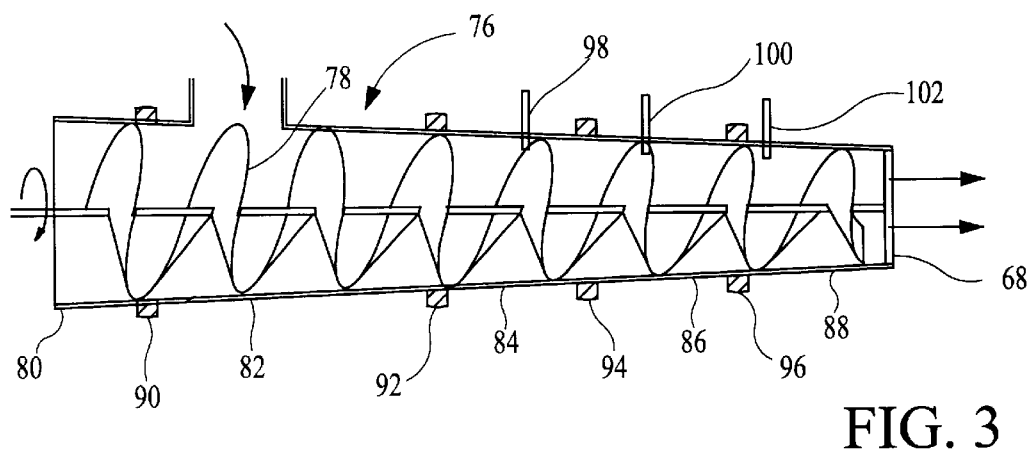
FIG. 3 is a schematic of the processing section of the extruder barrels of the single screw extruder of FIG. 2.

FIG. 3 is an expanded sectional view of the barrel section 76 of the extruder. Referring to FIG. 3, it will be seen that barrel section 76 is comprised of rotatable screw 78, of first barrel section 80, of second barrel section 82, of third barrel section 84, of fourth barrel section 86, and of fifth barrel section 88. As will be apparent, these barrel sections are connected to each other by claims 90, 92, 94, and 96.

In barrel section 80, the temperature is generally ambient; the same is true for barrel section 82. In barrel section 84, the temperature is generally from about 70 to about 100 degrees Fahrenheit; water cooling means (not shown) are used to maintain such a temperature, which is sensed by thermal transducer probe 98. In barrel section 86, the temperature generally is from about 145 to about 175 degrees Fahrenheit, and it also is maintained at this temperature by water cooling means; probe 100 senses the temperature in this section. In barrel section 88, the temperature generally is from about 280 to about 310 degrees Fahrenheit, and it is also cooled by conventional cooling means such as water cooling; a probe 102 disposed at the die 68 senses the temperature at the die.

Preparation of a Potato-starch Based Packaging Material

The description in the first part of this specification is primarily concerned with the preparation of a wheat starch based packaging material. The process described hereinabove also may be used to make a potato-starch based material.

Potato starch is a well known material and is described, e.g., in U.S. Pat. Nos. 5,536,525, 5,500,240, 5,498,832, 5,497,793, 5,472,732, 5,460,383, 5,389,322, 5,364,652, 4,981,710, and the like. The disclosure of each of these United States patents is hereby incorporated by reference into this specification.

Potato starch is commercially available and may be obtained, for example, from the Avebe company of Holland.

When potato starch is used instead of wheat starch, the following modifications should be made to the process described hereinabove: from about 70 to about 80 parts of potato starch, by weight of total dry material charged to mixer 10, are used; optionally one also may use from about 5 to about 10 weight percent of wheat starch; from about 11 to about 18 weight percent of the partially hydrolyzed polyvinyl alcohol is used; from about 0.8 to about 1.2 weight percent of the vegetable fat is used; from about 0.2 to about 0.4 weight percent of the inorganic nucleating agent is used; from about 0.05 to about 0.2 weight percent of the poly (methylvinylether/maleic acid) material is used; and from about 1.5 to about 5.0 weight percent of the maltrodextrin material is used. The finished potato starch product generally will contain from about 7.0 to about 9.5 weight percent of water, by weight of all material in the finished product. In general, the density of the product made with the potato starch is from about 0.40 to about 0.55.

In the processing of the potato starch mixture, in step 26 the mixture will be subjected to at temperature of from about 110 to about 130 degrees Fahrenheit. In step 28 the mixture will be subjected to a temperature of from about 275 to about 300 degrees Fahrenheit. In step 30 the mixture will be subjected to a temperature of from about 295 to about 330 degrees Fahrenheit.

The following Examples are presented to illustrate the claimed invention but are not to be deemed limitative thereof. Unless otherwise specified, all temperatures are in degrees Fahrenheit, and all parts are by weight.

In these Examples, an Extru-Tech extruder, model number 525, was used; this extruder is manufactured by the Extru-Tech Corporation of Sabetha, Kansas. It is a five-section extruder, each of which has a separate screw.

EXAMPLE 1

In the experiment of this example, 84.6 parts of native wheat starch purchased from the Archer Daniel Midlands Corporation, 10.0 parts of partially hydrolyzed polyvinyl alcohol purchased as Airvol 523 from the Air Products Corporation, 1.2 parts of soybean triglyceride sold by Kraft Foods Corporation, and 0.35 parts of talc sold by Whittaker, Clark, and Daniels, Inc. as product number 399, and 3.8 parts of maltodextrin purchased as "MO40" from the Grain Processing Corporation of Iowa, were charged to the hopper of the extruder. 9.6 parts of water were mixed with the dry material mixture, and the water/material mixture was conveyed through the barrel of the extruder. In section 84 of the extruder (see FIG. 3), the mixture was subjected to a temperature of about 85 degrees Fahrenheit. In section 86 of the extruder, the mixture was subjected to a temperature of about 168 degrees Fahrenheit. In section 88 of the extruder, the mixture was subjected to a temperature of 298 degrees Fahrenheit. The pressure within the extruder ranged from about 1,500 to about 1,900 pounds per square inch gauge.

The expanded starch produced had a density of about 0.42 pounds per cubic foot.

EXAMPLE 2

The procedure of Example 1 was substantially followed, with the exception that the concentration of the talc used was increased to 0.55 parts. The density of the product produced was 0.60 pounds per cubic foot.

EXAMPLE 3

The procedure of Example 1 was substantially followed, with the exception that no soybean triglyceride material was added. The material charge processed poorly. There was surging within the extruder, there was shredding of the product produced, and the product produced was substantially unusable and unsaleable.

EXAMPLE 4

The procedure of Example 1 was substantially followed, with the exception no polyvinyl alcohol was charged to the extruder. The product produced was an irregularly shaped, friable product which fractured readily, had poor cushioning properties, and was unusable and unsaleable.

EXAMPLE 5

The procedure of Example 1 was substantially followed, with the exception that, in barrel section 86, the temperature was 350 degrees Fahrenheit. The product produced had split ends, was friable and fractured readily, had poor cushioning properties, and was unusable and unsaleable.

EXAMPLE 6

In the experiment of this example, 74.7 parts of potato starch purchased from the Avebe company of Holland, 8.8 parts of native wheat starch purchased from the Archer Daniel Midlands Corporation, 12.5 parts of partially hydrolyzed polyvinyl alcohol purchased as Airvol 540 from the Air Products Corporation, 0.1 parts of soybean triglyceride sold by Kraft Foods Corporation, 0.35 parts of talc sold by Whittaker, Clark, and Daniels, Inc. as product number 399, 3.5 parts of maltodextrin purchased as "MO40" from the Grain Processing Corporation of Iowa, and 0.1 parts of poly(methylvinylether/maleic acid) purchased as "GANTREZ S-97 BF" from ISP Technologies, Inc. of Wayne, N.J., were charged to the hopper of the extruder. 3.2 parts of water were mixed with the dry material mixture, and the water/material mixture was conveyed through the barrel of the extruder. In section 84 of the extruder (see FIG. 3), the mixture was subjected to a temperature of about 110 degrees Fahrenheit. In section 86 of the extruder, the mixture was subjected to a temperature of about 265 degrees Fahrenheit. In section 88 of the extruder, the mixture was subjected to a temperature of 333 degrees Fahrenheit. The pressure within the extruder ranged from about 1,210 to about 1,920 pounds per square inch gauge.

The expanded starch produced had a density of about 0.45 pounds per cubic foot.

EXAMPLE 7

The procedure of Example 6 was substantially followed, with the exception that no "GANTREZ-S-97 BF" was used. The expanded starch product produced had a density of 0.534 pounds per cubic foot.

EXAMPLE 8

The procedure of Example 6 was substantially followed, with the exception that 0.5 parts of the soybean triglyceride material were used. The expanded starch produce had a density of 0.65 pounds per cubic foot.

EXAMPLE 9

The procedure of Example 6 was substantially followed, with the exception that no polvinyl alcohol material was used. A friable, product which was substantially golfball shaped and was unusable was produced.

EXAMPLE 10

The procedure of Example 6 was substantially followed, with the exception that 6.5 parts of water were used. The density of the expanded starch product produced was 0.70 pounds per cubic foot.

EXAMPLE 11

The procedure of Example 6 was substantially followed, with the exception that the temperature within barrel section 86 was 160 degrees Fahrenheit, and the temperature within barrel section 88 was 250 degrees Fahrenheit. The density of the expanded starch product produced was 0.60 pounds per cubic foot.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A substantially odor-free loosefill packing material with a density of from 0.33 to about 0.44 pounds per cubic foot, wherein said packing material is comprised of from about 70 to about 95 weight percent of wheat starch, by total weight, excluding weight of water, from about 9 to about 14 weight percent of partially hydrolyzed polyvinyl alcohol, by total weight, excluding weight of water, from about 0.7 to about 2.0 weight percent of vegetable fat, by total weight, excluding weight of water, from about 0.1 to about 0.4 weight percent of inorganic nucleating agent, by total weight, excluding weight of water, from about 3 to about 5 weight percent of maltodextrin with a dextrose equivalent less than 20, by total weight, excluding weight of water, and from about 6.0 to about 8.5 weight percent of water, by total weight of all materials in the packing material.

2. The packing material as recited in claim 1, wherein said packing material comprises from about 80 to about 92 parts of said wheat starch.

3. The packing material as recited in claim 2, wherein said polyvinyl alcohol has a degree of hydrolysis of from about 87 to about 90 percent.

4. The packing material as recited in claim 3, wherein said polyvinyl alcohol has a viscosity of from about 23 to about 27 centipoise.

5. The packing material as recited in claim 4, whereas said polyvinyl alcohol has a particle size distribution such that at least about 70 weight percent of the particles are between 0.5 millimeters and 2.0 millimeters.

6. The packing material as recited in claim 5, wherein said vegetable fat is a soybean triglyceride.

7. The packing material as recited in claim 6, wherein said inorganic nucleating agent is selected from the group consisting of talc, alkali metal bicarbonates, and alkaline earth metal bicarbonates.

8. The packing material as recited in claim 7, wherein said inorganic nucleating agent is talc with a specific gravity of about 2.8 and a hardness of about 1 Mohs.

9. The packing material as recited in claim 8, wherein said material further comprises from about 0.005 to about 0.5 weight percent of poly (methylvinylether/maleic acid), by total weight excluding the weight of said water.

10. The packing material as recited in claim 9, wherein said maltodextrin has a dextrose equivalent of less than about 10.

11. A substantially odor-free loosefill packing material with a density of from 0.40 to about 0.55 pounds per cubic foot, wherein said packing material is comprised of from about 70 to about 80 weight percent of potato starch, by total weight, excluding weight of water, from about 5 to about 10 weight percent of wheat starch, by total weight, excluding weight of water, from about 11 to about 18 percent of partially hydrolyzed polyvinyl alcohol, by total weight, excluding weight of water, from about 0.8 to about 1.2 weight percent of vegetable fat, by total weight, excluding weight of water, from about 0.2 to about 0.4 weight percent of inorganic nucleating agent, by total weight, excluding weight of water, from about 1.5 to about 5 weight percent of maltodextrin with a dextrose equivalent less than 20, by total weight, excluding weight of water, and from about 7.0 to about 9.5 weight percent of water, by total weight of all materials in the packing material.

12. The packing material as recited in claim 11, wherein said polyvinyl alcohol has a degree of hydrolysis of from about 87 to about 90 percent.

13. The packing material as recited in claim 12, wherein said polyvinyl alcohol has a viscosity of from about 45 to about 55 centipoise.

14. The packing material as recited in claim 13, wherein said polyvinyl alcohol has a particle size distribution such that at least about 70 weight percent of the particles are between 0.5 millimeters and 2.0 millimeters.

15. The packing material as recited in claim 14, wherein said vegetable fat is a soybean triglyceride.

16. The packing material as recited in claim 15, wherein said inorganic nucleating agent is selected from the group consisting of talc, alkali metal bicarbonates, and alkaline earth metal bicarbonates.

17. The packing material as recited in claim 16, wherein said inorganic nucleating agent is talc with a specific gravity of about 2.8 and a hardness of about 1 Mohs.

18. The packing material as recited in claim 17, wherein said material further comprises from about 0.05 to about 0.2 weight percent of poly(methylvinylether/maleic acid), by total weight excluding the weight of said water.

19. The packing material as recited in claim 18, wherein said maltodextrin has a dextrose equivalent of less than about 10.

* * * * *